United States Patent [19]

Stäuble et al.

[11] 3,972,269

[45] Aug. 3, 1976

[54] BRAKE CYLINDER FOR VEHICLES

[75] Inventors: Georg Stäuble; Bernd Wosegien, both of Munich, Germany

[73] Assignee: Knorr-Bremse GmbH, Munich, Germany

[22] Filed: Apr. 19, 1974

[21] Appl. No.: 462,417

[30] Foreign Application Priority Data
Apr. 19, 1973 Germany.............................. 2320022

[52] U.S. Cl...................................... 92/84; 92/129; 92/140; 188/72.6; 192/85 AA
[51] Int. Cl.².............................................. F16J 1/10
[58] Field of Search....................... 92/84, 129, 140; 188/72.6; 192/85 AA

[56] References Cited
UNITED STATES PATENTS

| | | |
|---|---|---|
| 2,806,568 | 9/1957 | Bliss............................ 192/85 AA X |
| 2,897,784 | 8/1959 | Harper.............................. 92/140 X |
| 2,944,581 | 7/1960 | Shymanski........................ 92/140 X |
| 2,965,207 | 12/1960 | Snyder........................ 192/85 AA X |
| 2,966,978 | 1/1961 | Kaptur........................ 192/85 AA X |
| 2,996,886 | 8/1961 | Jeffries........................ 192/85 AA X |
| 3,213,984 | 10/1965 | Cook............................ 192/85 AA X |
| 3,236,349 | 2/1966 | Wiggins...................... 192/85 AA X |
| 3,272,087 | 9/1966 | Culver ................................ 92/84 X |
| 3,430,739 | 3/1969 | Persson....................... 188/153 R X |
| 3,837,439 | 9/1974 | Piret .................................. 188/72.6 |

*Primary Examiner*—Martin P. Schwadron
*Assistant Examiner*—Abraham Hershkovitz
*Attorney, Agent, or Firm*—Edmund M. Jaskiewicz

[57] ABSTRACT

A brake cylinder for vehicles employs a spring plate as a transmission linkage between a piston and a piston rod coaxial with the piston. The spring plate is supported against a portion bearing against the piston rod. The inner end of the spring plate is acted upon by the piston.

8 Claims, 3 Drawing Figures

BRAKE CYLINDER FOR VEHICLES

The present invention relates to a brake cylinder for vehicles including railway vehicles, more particularly to the mechanical transmission linkage within the cylinder between the piston and the piston rod.

Various vehicles and particularly railway vehicles have been equipted with the brake cylinder having a cylinder housing in which there is provided at least one piston that can be subjected to the action of a pressure medium. This piston acts upon a piston rod disposed coaxially to the piston and a mechanical transmission linkage is provided between the piston and the piston rod.

In such brake cylinders, the transmission linkage generally consisted of a lever transmission having at least two levers that are resiliently connected to the piston rod in their central portions. The levers extend tranversely to the piston rod and are uniformly distributed around the axis of the piston. Each piston has one of its ends engaging the piston and their other ends resting on the cylinder housing. Since the number of levers is limited by the space available for the installation of such structure and since each lever must transmit a large proportion of the piston force, the levers and also the necessary pivot pins on the piston rod must have relatively large cross sections so as to be sufficiently strong to transmit the force. This structure is disadvantageous since it adversely affects the weight of the cylinder and significantly increases the manufacturing costs thereof. Further, over a long period of time it is virtually impossible to avoid wear of that portion of the lever bearing upon the piston rod.

It is therefore the principal object of the present invention to provide a novel and improved transmission linkage for a brake cylinder of the type described above.

It is further object of the present invention to provide such a brake cylinder having a transmission linkage which is simple in structure, small in size, but which is sufficiently strong to withstand all of the stresses to which it will be subjected.

It is another object of the present invention to provide an improved transmission linkage which can be easily installed in a brake cylinder and which will not increase the cost of the manufacturer or installation of the brake cylinder.

According to one aspect of the present invention a brake cylinder for vehicles and particularly for railway vehicles may comprise a cylinder housing in which is positioned a piston which is adapted to be subjected to the action of a pressure medium. Also within the housing is a rod coaxial with the piston and arranged so as to be actuated by the piston. A spring plate is pivotally mounted on a portion of the cylinder housing and has an intermediate annular portion acting against the piston rod. A portion of the piston also acts against the spring plate such that the spring plate constitutes a mechanical transmission linkage between the piston and the piston rod. The spring plate occupies a very small volume of space, is extremely low in weight, and can be mounted in a very simple structure. The resulting brake cylinder has an extremely high operational reliability because of the high stress capacity of the spring plate.

Other objects and advantages of the present invention will be apparent upon reference to the accompaning description when taken in conjunction with the following drawings, which are exemplary, wherein.

Proceeding next to the drawings wherein like reference symbols indicate the same parts throughout the various views a specific embodiment and modification of the present invention will be described in detail.

Figure 1:
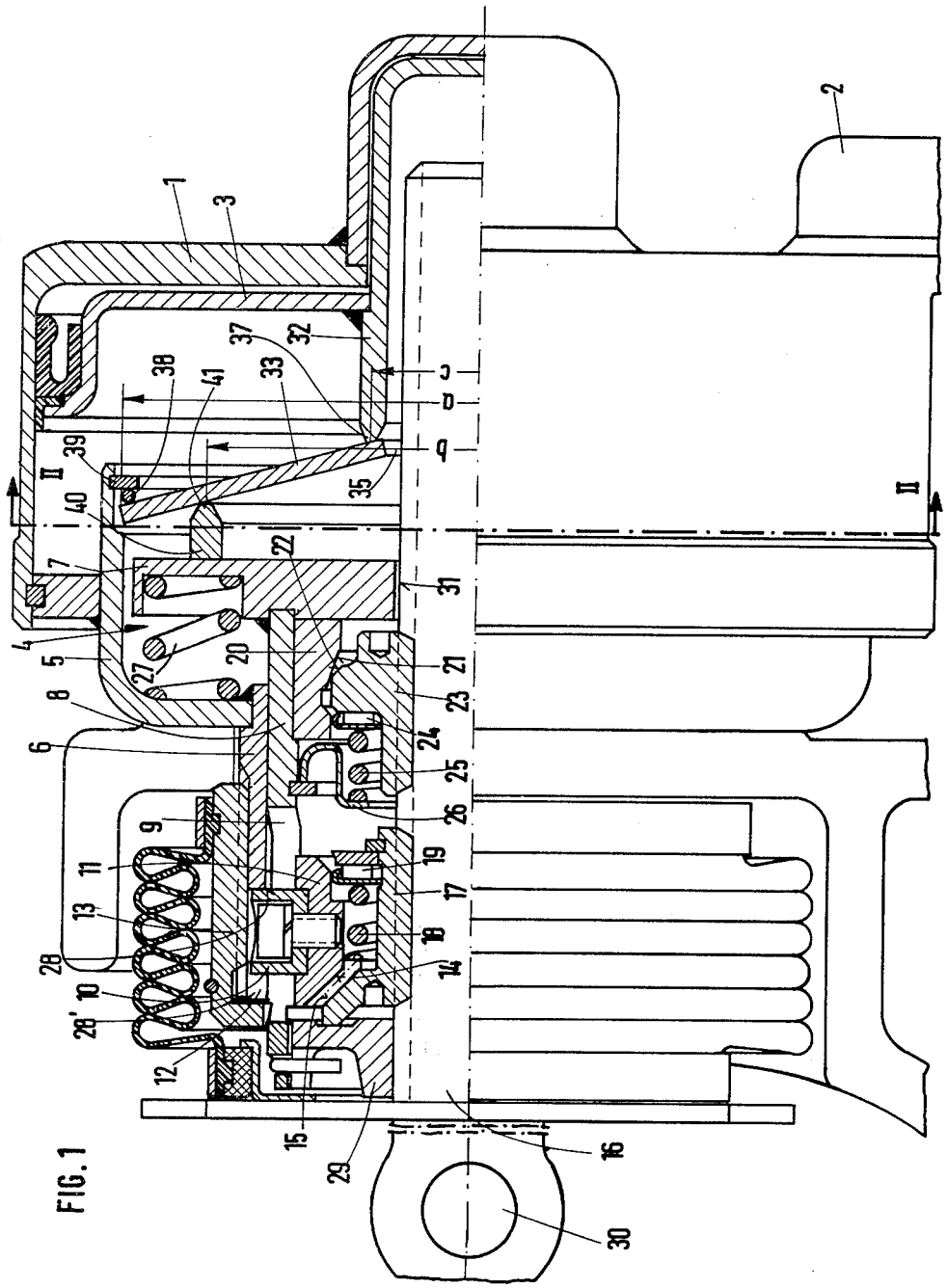
FIG. 1 is side elevational view of a brake cylinder according the present invention with the upper half of the cylinder being shown in a longitudinal section.

In FIG. 1, a brake cylinder housing 1 has a connection 2 for a supply of a suitable pressure medium such as compressed air which is not illustrated. A piston 3 is sealingly disposed within cylinder 1 for axial displacement therein and acts by means of a transmission linkage, which will be subsequently described in detail, upon a piston rod having the form of an adjusting device indicated generally at 4. The brake cylinder housing 1 is closed by a cover 5 to which is attached a sleeve 6 for guiding the axial displacement of the adjusting device 4.

The adjusting device 4 comprises a pressure plate 7 connected to a piston rod tube 8 which is guided for axial displacement in sleeve 6. The tube 8 is provided with at least one longitudinal slot 9 which extends approximately through half the length of piston rod tube 8 and in which slot will be received a sliding head 10 bolted upon an abutment ring 11. The axial guiding of the head 10 secures the piston rod tube 8 and pressure plates 7 against rotary movement.

The head 10 extends through longitudinal slot 9 and engages a longitudinal slot 12 in the inner peripheral surface of the sleeve 6. The left end of slot 12 is defined by an internal flange on a cap 13 threaded upon the sleeve 6.

On the face of the abutment ring 11 away from pressure plate 7 there is provided a bevel gear arrangement 14 shown in FIG. 1 engaged with a corresponding bevel gear 15 of a nut 17 threaded with a non-self-locking thread on a threaded spindle shaft 16. The bevel gear surface 14 and 15 are retained in engagement by a helical compression spring 18 one end of which rests upon abutment ring 11 and the other end rests upon nut 17 by means of a radial bearing support surface 19.

On the inner peripheral surface of piston rod tube 8 there is mounted an abutment ring 20 which is in the immediate vicinity of the pressure plate 7. The ring 20 has an angular coupling surface 21 which is engaged by a corresponding coupling surface 22 formed on a second nut 23 similarly threaded on the spindle shaft 16. A helical compression spring 25 has one end resting upon a radial bearing support surface 24 on the nut 23 on the side away from the coupling surface 22. The other end of spring 25 is retained in a cup-shaped member 26 secured to the inner surface of piston rod tube 8. As shown in FIG. 1, the spring 25 holds coupling surfaces 21 and 22 in coupled engagement.

The head 10 of abutment ring 11 is maintained in abutting relationship with the right end of 28 of slot 12 by means of at least one compression spring 27 having one end bearing against pressure plate 7 and the other end bearing against housing cover 5. The force of the spring exerted against pressure plate 7 is applied through the piston rod tube 8, coupled plate 26, compression spring 25, nut 23 which is threaded upon spindle shaft 16 and thus carries along nut 17 with its gearing 15 acting against gearing 14 on the ring 11. The right hand end of slot 12 which is formed by the inner flange end cap 13 is indicated at 28'.

One end of the shaft 16 extends outwardly of the cylinder through an end plate 29 of piston rod tube 8 and is provided with an eye 30 for a pivotal connection to a brake linkage not shown in the drawing. The other end of threaded shaft 16 extends axially displaceable through an opening 31 in pressure plate 7 and terminates in a cup-shaped member 32 secured to piston 3 and opening toward pressure plate 7.

A conical shaped spring plate 33 of spring steel tapering toward piston 3 constitutes the connection between piston 3 and the piston rod in the form of adjusting device 4. Spring plate 33 is provided with a plurality of radially extending slots 34 which extend from an outer annular region toward the center of the plate and terminate in a central circular opening 35 as may be seen in FIG. 2. The ends of the slots 34 are provided with enlarged openings 36 which are arcuately arranged in order to avoid notch stresses. An inner portion of spring plate 33 adjacent the edge of central opening 35 is engaged by edge 37 of cupshaped member 32 which is attached to the piston 3. The edge 37 is tapered on both sides thereof.

The outer edge portion of spring plate 33 contacts a flat annular element 38 resting against a ring 39 inserted into the housing cover 5. The face of spring plate 33 directed toward piston 3 engages the annular element 38. On the face of spring plate 33 away from piston 3 and annular element 38, the pressure plate 7 has attached thereto a tubular member 40 which also has a tapering edge 41 which engages this face of spring plate 33. The diameter $b$ of edge 41 of tubular member 40 is preferably greater than one-half of the distance between diameter $a$ of ring 39 and the diameter $c$ of edge 37 of cup-member 32.

When a pressure medium is introduced into the brake cylinder through connection 2, piston 3 will be displaced to the left as viewed in FIG. 1. The force of the piston is amplified by the spring plate 33 which functions as a transmission linkage and is transmitted to tubular member 40 and, accordingly, to the piston rod in the form of adjusting device 4. The amplification will depend upon the ratio selected for the contact surfaces upon the spring plate 33. Upon this transmission of force, the spring plate 33 which has its end supported on annular element 38 is bent to the left as shown in the drawings in its region located within the annular element 38. The transmission ration $i$ is determined by the relationship of the three diameters $a$, $b$, $c$, and this relationship is according to the formula $i = (a-c):(a-b)$.

Since both piston 3 and also the piston rod through adjusting device 4 are engaged by annular services in each case and the spring plate itself is supported on cylinder housing 1 through its cover 5 by means of an annular surface, the resulting surface pressures and, accordingly, the local stresses generated in the spring plate 33 are relatively low. As a result, the spring plate can be made relatively thin and excessive annular stresses in the spring plate are prevented by the presence of slots 34 and enlarged openings 36.

As can also be seen in FIG. 1, the spring plate 3 requires a minimum amount of space and can be readily mounted in a simple manner. Annular stresses in the plate are reduced by the presence of the slots and openings as described above so that the plate also becomes more flexible.

The construction of the piston rod includes a known resetting device and a threaded shaft which extends on the piston side through the central opening of the spring plate. This has the effect of significantly reducing the length of the brake cylinder. In order to obtain precise predetermined spring characteristics of the spring plate, the plate may be constructed in accordance with the invention of at least two plate parts of different spring properties that are connected to each other, such as, by rivets and located coaxilly with respect to each other.

The force upon piston 3, amplified as described above, is transmitted through spring plate 33 to tubular member 40 onto pressure plate 7, then transferred by piston rod tube 8, abutment ring 20 and its coupling surface 21 to nut 23 and by means of the threaded connection to shaft 16. Since shaft 16 is maintained against rotary movement because of its connection to the brake linkage, the shaft will move toward the left as seen in the drawings and will thus accomplish a stroke that effects the braking action. As long as the brake stroke remains within a range as determined by abutment surfaces 28 and 28' and adjustable by selected turning for screw cap 13, the nut 17, which is maintained against rotation by spring 18, abutment ring 11 and coupling 14, 15 will be moved along during every movement of threaded shaft 16. Upon completion of the braking action, pressure plate 7, together with piston rod tube 8 and nut 23, acted upon by spring 25, and shaft 16 together with piston 3 through the action of spring plate 33 will be moved back into the release position under the action of spring 27. The restoring force of spring 27 is assisted by the inherent tension of spring plate 33. The nut 17 which is maintained against rotation by abutment ring 11 will also follow along with the movement of threaded shaft 16.

In the event a brake stroke should increase beyond the magnitude as determined in advance by abutment surfaces 28 and 28' becuase of wear of the brake linings or some form of defect occurring during the actuation of piston 3, threaded shaft 16 will be shifted in the braking direction beyond the normal brake stroke as determined in advance. After the predetermined brake stroke, the abutment ring will be held in position because of the sliding head 10 abutting on surface 28'. Through the interaction of spring 18 and bearing surface 19, the abutment ring 11 will exert a force on nut 17 which is opposed to the braking force. As a result, the geared coupling surface of nut 17 will be disengaged from the geared coupling surface 14 of abutment ring 11 and the nut 17 will be threaded to the right upon shaft 16.

In the event the pressure plate 7 and together therewith piston 3 are again pushed by spring 27 into the release position after completion of the braking operation, the abutment ring 11 together with nut 17 which are again coupled by meshing of their surfaces 14, 15 will again abut against abutment surface 28. After the release stroke has been completed, abutment ring 11 will block shaft 16 against any further movement to the right.

Since the nut 17 was previously threaded to the right upon shaft 16 during the excessive braking stroke, the shaft will no longer return into its original position but will stop in front of this position. However, abutment ring 20 will follow further movement of piston rod 8 into the release position of piston 3 as shown in the drawings. The abutment ring 20 will again be separated from nut 23 which is threaded upon shaft 16. The spring 25 resting upon piston rod tube 8 through spring cup 26 will then act upon bearing surface 24 to turn nut 23 to the right until the nut is again friction coupled to abutment ring 20. The net effect will be that the threaded shaft 16 will project from piston rod tube 8 to the left as seen in the drawings by an additional amount which is equivalent to the amount of adjusting. Since the piston end of shaft 16 extends beyond pressure plate 7 and through central opening 35 of spring plate 33 into the cupshaped member 32 connected to piston 3, the overall length of the brake cylinder is relatively short in view of the large magnitude of adjustment which is possible.

Figure 3:
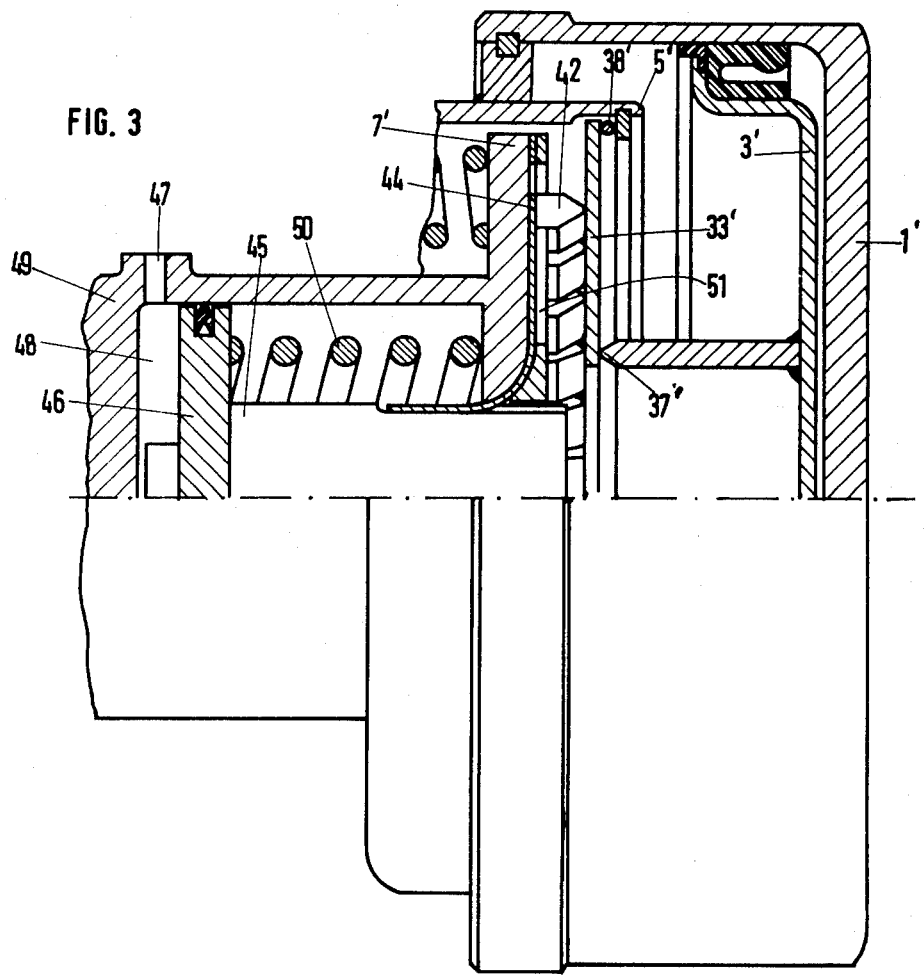
FIG. 3 is a portion of a view similar to that of FIG. 1 and showing a modification thereof.

In the modification of FIG. 3, the transmission ratio between the piston and the piston rod is automatically variable as a funtion of the load on the vehicle. According to the modification this may be accomplished by varying the diameter of the annular contact element of the piston and/or the piston rod.

Figure 2:
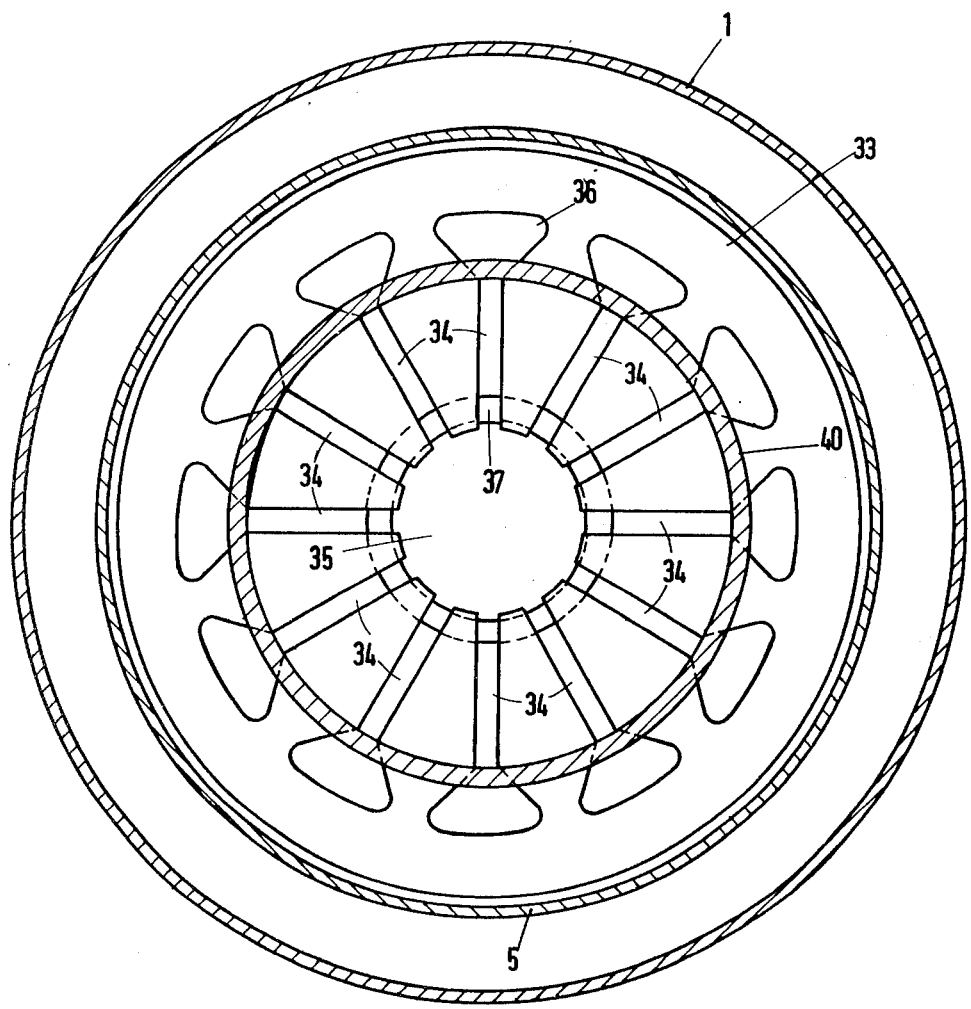
FIG. 2 is a sectional view taken along the line II—II of FIG. 1.

Piston 3' which is subjected to the action of pressure medium and is axially displaceable in brake cylinder housing 1' has an annular bearing edge 37' contacting spring plate 33' which is employed as the transmission linkage. The plate 33' is retained on its outer edge on the piston side by means of an annular element 38' mounted within cover 5' which is a component of cylinder housing 1' on the side away from piston 3'. The tubular member 40 of FIG. 1–2 is replaced by a plurality of individual annularly arranged arcuate segments 42. Each segment 42 is individually connected to a spring steel plate 44 which is substantially radially positioned and rests upon a radial surface of pressure plate 7'. The ends of spring plates 44 away from the segments 42 are bent through an angle of about 90° and are attached to an adjustment element 45 which is mounted for axial displacement in plate 7'. The adjusting element 45 is connected to a piston 46 which is axially displaceable in a cylinder chamber 48 provided with a connection 47 through which is introduced a pressure medium. A cylinder chamber 48 within a piston rod 49 is connected to the pressure plate 7' and at its other end, not shown in the drawings, is provided with an eye for pivotal connection to the brake linkage in the manner as described above. The side of piston 46 toward adjusting element 45 is acted upon by a compression spring 46 whose other end rests upon pressure plate 7'.

A known balancing valve is connected to connection 47 in a manner not illustrated and the valve produces a pressure which is proportional to the load on the vehicle.

In the no-load state of the vehicle the balancing valve does not produce any pressure and the piston 46 will be in its illustrated position under the action of spring 50. The segments 42 are now located in positions adjacent to supporting edge 37". The transmission linkage defined by spring plate 33' interposed between piston 3' and piston rod 49 now has its lowest transmission ratio.

When a load is imposed upon the vehicle, the cylinder chamber 48 will be subjected to the action of a pressure medium proportional to this load and piston 46 will be displaced against the force of spring 50. As a result, the arcuate elements 42 will be displaced radially outwardly toward the outer edge of spring plate 33' under the action of adjusting element 45 and spring steel plates 44. The diameter $b$ of the bearing elements consisting of arcuate elements 42 will thus be increased and, accordingly, the transmission ratio of the transmission linkage will also be increased. A guide plate 51 is positioned on the radial surface of pressure plate 7' to guide the radial displacement of spring steel plates 44.

It should be noted that the brake cylinder in FIG. 3 whose transmission ratio may be varied as a function of the load on the vehicle may also be provided with a piston rod equipted with an adjusting device in the same manner as a brake cylinder of FIGS. 1 and 2 rather than being provided with the relatively simple piston rod 49. Similarly, spring plate 33' of FIG. 3 may also be bowed toward piston 3' in the manner as shown in FIG. 1.

In the same manner as spring plate 33' is supported on the load dependent adjustable arcuate elements 42, the brake cylinder could be modified to support spring plate 33' on piston 3' or on cylinder housing 1' through a supporting structure which is adjustable in diameter. Either a single or a plurality of such adjustable supporting surfaces or the spring plate may be employed in such a brake cylinder.

The brake cylinder according to the present invention has a variable transmission ratio which can be advantageously employed in load responsive brake systems and vehicles having a relatively high ratio between the no-load and the fully loaded states. Further, the brake cylinder can be so used without the necessity for changing or modifying the other components of such a brake system.

It will be understood that this invention is susceptible to modification in order to adapt it to different usages and conditions, and accordingly, it is desired to comprehend such modifications within this invention as may fall within the scope of the appended claims.

What is claimed is:

1. A brake cylinder for vehicles and particularly for railway vehicles comprising a cylinder housing, a piston within said cylinder housing and adapted to be subjected to the action of a pressure medium, a rod coaxial with said piston and actuable thereby, a spring plate having a plurality of radial slots therein and having its outer edge portion pivotally supported on said cylinder housing, said spring plate further having an intermediate annular portion thereof acting against said piston rod, a spring acting against said piston rod opposite to the direction of the pressure medium, there being a portion of said piston acting against an inner portion of said spring plate such that said spring plate constitutes a mechanical transmission linkage between said piston and said rod, said plurality of radial slots in said spring plate extend inwardly from the outer portion thereof supported upon said cylinder housing past the portions thereof acting upon said piston rod and said piston.

2. A brake cylinder as claimed in claim 1 and an annular member within said cylinder housing and supporting said spring plate.

3. A brake cylinder as claimed in claim 1 and annular contact elements on said piston and piston rod acting upon said spring plate.

4. A brake cylinder as claimed in claim 1 wherein there is a central substantially circular opening in said spring plate at which said slots terminate.

5. A brake cylinder as claimed in claim 4 wherein said piston rod has on its piston end an axial threaded shaft extending through said spring plate central opening, and means on said threaded shaft for adjusting automatically the length of the stroke of said rod.

6. A brake cylinder as claimed in claim 3 wherein said piston rod annular contact element has a variable diameter.

7. A brake cylinder as claimed in claim 6 wherein said annular contact element comprises a plurality of arcuate segments, a plurality of spring steel plates each connected to said segments and engageable upon a radial surface of said piston rod in the vicinity of said segments, axially displaceable adjusting means within said piston rod, the ends of said spring steel plates away from said segments being bent through an angle of about 90° and connected to said adjusting means.

8. A brake cylinder as claimed in claim 7 and a second piston connected to said adjusting means, a compression spring acting on one side of said adjusting piston and a pressure medium at a pressure proportional to the load of the vehicle acting on the other side of said second piston.

\* \* \* \* \*